United States Patent [19]
Graham et al.

[11] 3,803,072
[45] Apr. 9, 1974

[54] PLASTICIZED ETHYLENE/VINYL CHLORIDE/ACRYLAMIDE COMPOSITIONS

[75] Inventors: Paul R. Graham, Ballwin; Joseph G. Bergomi, Jr., St. Louis, both of Mo.

[73] Assignee: Monsanto Company, St. Louis, Mo.

[22] Filed: Jan. 2, 1970

[21] Appl. No.: 379

[52] U.S. Cl.............260/29.6 TA, 117/155 UA, 260/30.4 N, 260/30.6 R, 260/30.8 R, 260/31.2 N, 260/31.6, 260/31.8 R, 260/33.6 UA, 260/33.8 UA
[51] Int. Cl. ......C08f 45/38, C08f 45/46, C08f 45/40
[58] Field of Search........... 260/31.8, 80.73, 87.5 C, 260/31.6, 30.6, 31.4, 31.2, 29.6 TA

[56] References Cited
UNITED STATES PATENTS

| | | | |
|---|---|---|---|
| 3,075,940 | 1/1963 | Pazinski | 260/31.8 |
| 3,112,290 | 11/1963 | Salyer | 260/31.8 |
| 3,252,929 | 5/1966 | Meyer | 260/31.8 |
| 3,256,224 | 6/1966 | Fisher | 260/31.8 |
| 3,318,836 | 5/1967 | Joyce | 260/31.8 |
| 3,356,658 | 12/1967 | Anderson | 260/31.8 |
| 3,399,157 | 8/1968 | Deex | 260/87.5 C |
| 3,328,330 | 6/1967 | Trofimow | 260/29.6 TA |
| 3,428,582 | 2/1969 | Deex | 117/161 UT |

*Primary Examiner*—Morris Liebman
*Assistant Examiner*—P. R. Michl
*Attorney, Agent, or Firm*—N. E. Willis; J. E. Maurer; R. J. Klostermann

[57] ABSTRACT

Ethylene/vinyl chloride/acrylamide interpolymers plasticized with a compatible plasticizer are useful as pigment binders in pigment coating compositions for cellulosic substrates such as paper and paperboard.

41 Claims, No Drawings

PLASTICIZED ETHYLENE/VINYL CHLORIDE/ACRYLAMIDE COMPOSITIONS

This invention relates to plasticized compositions comprising ethylene/vinyl chloride/acrylamide interpolymers and compatible plasticizers and to their use as pigment binders in pigment coating compositions particularly adapted for cellulosic substrates such as paper and paperboard.

The term "E/VCl/A interpolymer" as used herein means ethylene/vinyl chloride/acrylamide terpolymers and higher polymers thereof.

The term "compatible plasticizer" as used herein means any plasticizer which does not manifest itself in exudation, blooming or track development on the surface of the E/VCl/A interpolymer immediately upon compounding or during the average use life of the plasticized interpolymer and includes any plasticizer capable of forming a single phase with the E/VCl/A interpolymer whether it be a liquid, solid or gum of synthetic or natural origin.

The term "pick resistance" as used herein means the ability of a pigment coating composition to resist the pull of tacky printing inks and remain adhered to the substrate.

E/VCl/A interpolymers have found many useful applications in the paper industry because of their physical and chemical properties. The E/VCl/A interpolymers are particularly useful as pigment binders or adhesives in pigment coating compositions and as bonding agents for bonded nonwoven fibrous products. When used as pigment binders or adhesives in pigment coating compositions the E/VCl/A interpolymers provide coatings which exhibit excellent gloss and wet rub resistance but have a pick resistance which could be improved upon, particularly with high tack printing inks.

It is an object of this invention to provide improved E/VCl/A interpolymer compositions.

Another object of this invention is to provide E/VCl/A interpolymer compositions which result in improved pigment binder compositions.

The above and other objects of this invention are carried out by a process which comprises admixing E/VCl/A interpolymer with a compatible plasticizer in order to form a plasticized E/VCl/A interpolymer composition.

The plasticized E/VCl/A interpolymer compositions of this invention result in pigment binder compositions which exhibit excellent gloss and wet rub resistance and are further characterized by improved pick resistance.

The E/VCl/A interpolymers and compatible plasticizer can be admixed by any means known in the art as, for example, by stirring or grinding. Admixture can be carried out by adding the plasticizer to a solution of the polymer in a suitable solvent followed by solvent removal to obtain a homogeneous plasticized interpolymer. Suitable solvents include dimethylformamide, dimethylacetamide, pyridine and the like. Admixture can also be carried out by adding the plasticizer to an aqueous emulsion or dispersion of the interpolymer. In many applications the plasticized E/VCl/A interpolymer in aqueous emulsion or dispersion will be used in latex form without further treatment.

The E/VCl/A interpolymers which are useful in the preparation of the plasticized E/VCl/A interpolymer compositions of this invention generally contain from about 2 to about 70 weight percent ethylene, from about 30 to about 88 weight percent vinyl chloride, and from about 0.1 to about 10 weight percent of a polar monomer component. The polar monomer component can be entirely acrylamide or a portion of the acrylamide can be replaced by one or more polar monomers selected from the group consisting of acrylonitrile, N-(lower alkyl) acrylamide and N-(lower alkyl) methacrylamide containing from one to three carbon atoms in the lower alkyl groups, N-methylol acrylamide, N[2-(2-methyl-4-oxopentyl)] acrylamide, acrylic acid, methacrylic acid, and alkali metal and ammonium salts of acrylic and methacrylacrylic acids, maleic acid, fumaric acid, half and complete alkali metal and ammonium salts of maleic and fumaric acid, aconitic acid, itaconic acid, citraconic acid, and alkali metal and ammonium salts thereof, acrylyl and methacrylyl esters of hydroxyalkanoic acids having from two to about six carbon atoms in the alkanoic acid moieties, acrylylamides and methacrylylamides of aminoalkanoic acids having from two to about six carbons in the aminoalkanoic acid, hydroxyethyl and hydroxypropyl esters of acrylic, methacrylic, maleic, and fumaric acids, vinyl esters of alkanoic acids having from one to six carbon atoms such as vinyl acetate, vinyl propionate, and lower alkyl (one to six carbon atoms) sulfonic acid, vinyl esters of phenylsulfonic acids, and alkylphenylsulfonic acids and acrylyl and methacrylyl esters of hydroxyalkylsulfonic acids having from one to six carbon atoms in said alkyl moieties, and hydroxyalkylsulfonamides having from one to six carbon atoms in said hydroxyalkyl moieties. The polar monomer component generally contains at least 10 weight percent acrylamide and preferably at least 50 percent acrylamide.

Thus the interpolymers are at least terpolymers containing ethylene, vinyl chloride and acrylamide and may be a quaternary or higher polymer containing one or more of the above exemplified additional polar monomers in small quantities. Generally such additional polar monomers will not be present in the interpolymer in quantities greater than about 3 percent by weight.

It is preferred that the interpolymer contain from about 15 percent to about 70 percent ethylene, 30 percent to about 85 percent vinyl chloride, and from about 1 percent to about 5 percent acrylamide. A specific example of choice is a terpolymer containing from about 19 to about 23 percent ethylene, about 74 to about 78 percent vinyl chloride, and from about 2 to about 4 percent acrylamide.

The interpolymers used in accordance with this invention can be modified, and the modified interpolymers are preferred for use in this invention as pigment binders. The interpolymers are particularly amenable to hydrolytic modification by the use of small quantities of a strongly alkaline material such as an alkali metal hydroxide, or a quaternary ammonium hydroxide such as tetramethyl ammonium hydroxide, or by a strong acid such as the mineral acids, e.g., hydrochloric, sulfuric, phosphoric, nitric. The base or acid used preferably has an ionization constant higher than $10^{-4}$ at 25°C.

The hydrolytic modification is carried out by treating an aqueous dispersion of polymer latex of the ethylene, vinyl chloride, and acrylamide with aqueous base or acid in an amount chemically equivalent to from about 0.1 to about 100 percent of the amide equivalent in the interpolymer.

Specific examples of polar monomers which can be used, as described above, to replace part of the acrylamide in the polar monomer component of the interpolymer useful in this invention include acrylonitrile, N-methacrylamide, N-ethylacrylamide, N-propylacrylamide, methacrylamide, acrylic, methacrylic, maleic, fumaric, itaconic, aconitic, and citraconic acids and alkali metal and ammonium salts of such acids, preferably the sodium potassium or ammonium salts, alkyl esters of such acids, e.g., methyl acrylate, ethylacrylate, butyl acrylate, methyl methacrylate, butyl methacrylate, ethyl methacrylate, monoethyl maleate, dipropyl fumarate, acrylyl 3-hydroxyproprionate, methacrylyl hexamide, 2-hydroxyethyl and 2-hydroxypropyl esters of acrylic, methacrylic, maleic, fumaric, itaconic, aconitic, and citraconic acids, vinyl formate, vinyl acetate, vinyl hexanoate, vinyl and alkyl esters of propanesulfonic acid, vinyl phenylsulfonate, acrylyl and methacrylyl esters of 2-hydroxypropyl sulfonic acid, and N-acrylyl and N-methacrylyl 2-hydroxypropanamides.

Illustrative of interpolymers which are useful in this invention are ethylene/vinyl chloride/acrylamide, ethylene/vinyl chloride/acrylamide/hydroxyethylacrylate, ethylene/vinyl chloride/acrylamide/N-isopropylacrylamide, ethylene/vinyl chloride/acrylamide/diammonium itaconate, ethylene/vinyl chloride/acrylamide monobutyl acid maleate, ethylene/vinyl chloride/acrylamide/N-methacrylyl propionamide, ethylene/vinyl chloride/acrylamide/sodium acrylate and ethylene/vinyl chloride/acrylamide/sodium methacrylate.

The compatible plasticizers useful in this invention are represented by the following:

a. esters having up to 22 carbon atoms formed by the reaction of an aliphatic monocarboxylic acid having from two to 18 carbon atoms and an alcohol selected from the group consisting of monohydric alcohols having from one to six carbon atoms, dihydric alcohols having from two to eight carbon atoms, glycerol, tetrahydrofurfuryl alcohol, and ether alcohols having from two to eight carbon atoms;

b. esters formed by the reaction of an aliphatic polycarboxylic acid having from six to 10 carbon atoms and an alcohol selected from the group consisting of monohydric alcohols having from one to 11 carbon atoms, tetrahydrofurfuryl alcohol and ether alcohols having from two to eight carbon atoms;

c. esters formed by the reaction of an aryl carboxylic acid having from seven to 10 carbon atoms and an alcohol selected from the group consisting of monohydric alcohols having from one to 13 carbon atoms, dihydric alcohols having from two to six carbon atoms, glycerol, pentaerythritol, phenols having from six to eight carbon atoms, tetrahydrofurfuryl alcohol, and ether alcohols having from two to eight carbon atoms;

d. phosphoric acid derivatives selected from the group consisting of trialkyl phosphates, trialkoxy alkyl phosphates, alkyl aryl phosphates, trialkylaryl phosphates, triaryl phosphates and trihaloalkyl phosphates having two to 18 carbon atoms in each alkyl or alkoxy group;

e. sulfonamides selected from the group consisting of N-alkyl and N-allyl arylsulfonamides, arylsulfonamides, hydroxyalkyl arylsulfonamides, N,N-dialkyl arylsulfonamides, and N,N-bis(cyanoalkyl) arylsulfonamides of not more than 12 carbon atoms in each alkyl or aryl group;

f. hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from two to four carbons;

g. cyanamides selected from the group consisting of allyl cyanamide, alkyl cyanamides and aralkyl cyanamides wherein the alkyl group contains from about one to about 10 carbon atoms and the aralkyl group contains from about seven to about nine carbon atoms;

h. epoxy compounds selected from the group consisting of epoxy esters, glycidols and glycidyl ethers;

i. chloroalkanes and mixtures thereof having from about 10 to about 25 carbon atoms, from about seven to about 21 chlorine atoms, and containing an average of 40 to 70 weight percent chlorine, and j. terminated polyesters having an average molecular weight of less than 4,000 comprising the residue of a dihydroxy eliphatic compound of from two to six carbon atoms and a saturated, aliphatic dicarboxylic acid of from four to 10 carbon atoms, said polyester being terminated with a member selected from the group consisting of residues of mono-carboxylic saturated and unsaturated aliphatic acids of from six to 20 carbon atoms, benzoic acid, naphthoic acid, saturated aliphatic alcohols of from four to 20 carbon atoms and phenylalkyl and phenoxyalkyl alcohols of from seven to 10 carbon atoms.

Non-limiting examples of plasticizers encompassed by the aforementioned classes of plasticizers suitable for use in the practice of this invention include the following:

a. aliphatic monocarboxylic acid esters, for example, acetates such as glycerol monoacetate, glycerol diacetate, glycerol triacetate and glycerol ether acetate; propionates such as glycerol tripropionate, ethylene glycol dipropionate, diethylene glycol dipropionate and triethylene glycol dipropionate; butyrates such as glycerol butyrate and ethylene glycol dibutyrate; laurates such as n-butyl laurate, ethylene glycol monolaurate, 1,2-propylene glycol monolaurate, diethylene glycol monolaurate, methyl cellosolve laurate, butyl cellosolve laurate and polyethylene glycol monolaurate; oleates such as methyl oleate, propyl oleate, isopropyl oleate, butyl oleate, amyl oleate, glycerol monoleate, tetrahydrofurfuryl oleate, ethylene glycol monomethyl ether oleate, ethylene glycol monobutyl ether oleate, diethylene glycol monoleate and 1,2-propylene glycol monoleate; palmitates such as isopropyl palmitate, butyl palmitate, tetrahydrofurfuryl palmitate and methyl cellosolve palmitate; ricinoleates such as methyl ricinoleate, butyl ricinoleate, methyl acetyl ricinoleate, n-butyl acetyl ricinoleate, ethylene glycol ricinoleate, propylene glycol ricinoleate, methoxyethyl acetyl ricinoleate, diethylene glycol monoricinoleate and glyceryl ricinoleate; and stearates such as butyl stearate, 1,2-propylene glycol monostearate and ethylene glycol monoethyl ether stearate;

b. aliphatic polycarboxylic acid esters, for example, adipates such as diethyl adipate, dibutyl adipate, diisobutyl adipate, di-n-hexyl adipate, di(1,3-dimethyl butyl) adipate, dicapryl adipate, diisooctyl adipate, di-(2-ethylhexyl) adipate, n-octyl n-decyl adipate mixture, dinonyl adipate, didecyl adipate, dibenzyl adipate, ditetrahydrofurfuryl adipate, di(butyl cellosolve) adipate and di-(butyl carbitol) adipate; azelates such as diisobutyl azelate, di-(2-ethylbutyl) azelate, di-(2-ethylhexyl) azelate, diisooctyl azelate and dibenzyl azelate; sebacates and isosebacates such as dimethyl sebacate, diethyl sebacate, dibutyl sebacate, dihexyl sebacate, dioctyl sebacate, diisooctyl sebacate, dicapryl sebacate, dibenzyl sebacate, butyl benzyl sebacate, di-(1,3-dimethyl butyl) sebacate, dibutoxyethyl sebacate, di-(butyl cellosolve) sebacate and di-(2-ethylhexyl) isosebacate; and citrates such as triethyl citrate, tri-n-butyl citrate, acetyl triethyl citrate and acetyl tri-n-butyl citrate;

c. aryl carboxylic acid esters, for example, benzoates such as diethylene glycol dibenzoate, dipropylene glycol dibenzoate, triethylene glycol dibenzoate, pentaerythritol tetrabenzoate, 3-methyl-1,5-pentanediol dibenzoate and 2-ethylhexyl-p-oxybenzoate; phthalyl glycollates such as methyl phthalyl methyl glycollate, methyl phthalyl ethyl glycollate, ethyl phthalyl ethyl glycollate, propyl phthalyl propyl glycollate, butyl phthalyl butyl glycollate, isobutyl phthalyl isobutyl glycollate, hexyl phthalyl hexyl glycollate, cyclohexyl phthalyl cyclohexyl glycollate, 2-ethylhexyl phthalyl 2-ethylhexyl glycollate, decyl phthalyl decyl glycollate, decyl phthalyl 2-ethylhexyl glycollate, dodecyl phthalyl dodecyl glycollate, tridecyl phthalyl tridecyl glycollate, benzyl phthalyl decyl glycollate, phenyl phthalyl ethyl glycollate, tolyl phthalyl ethyl glycollate, xylyl phthalyl ethyl glycollate, benzyl phthalyl ethyl glycollate and tetrahydrofurfuryl phthalyl ethyl glycollate; phthalates and isophthalates such as dimethyl phthalate, diethyl phthalate, dipropyl phthalate, dibutyl phthalate, diisobutyl phthalate, diamyl phthalate, dihexyl phthalate, di-n-octyl phthalate, diisooctyl phthalate, dicapryl phthalate, di-(2-ethylhexyl) phthalate, dinonyl phthalate, didecyl phthalate, butyl isohexyl phthalate, butyl octyl phthalate, butyl decyl phthalate, decyl octyl phthalate, diallyl phthalate, butyl cyclohexyl phthalate, dicyclohexyl phthalate, methylcyclohexyl isobutyl phthalate, di-(methylcyclohexyl) phthalate, butyl benzyl phthalate, cresyl benzyl phthalate, benzyl cyclohexyl phthalate, diphenyl phthalate, dibenzyl phthalate, glycerol phthalate, dimethoxyethyl phthalate, diethoxyethyl phthalate, dibutoxyethyl phthalate and di-(2-ethylhexyl) isophthalate; terephthalates such as diisobutyl terephthalate and di-(2-ethylhexyl) terephthalate; trimellitates such as trimethyl trimellitate, triethyl trimellitate, tributyl trimellitate, trihexyl trimellitate, triisooctyl trimellitate, tri-2-ethylhexyl trimellitate and triisodecyl trimellitate; and pyromellitates such as tetramethyl pyromellitate; tetraethyl pyromellitate; tetrabutyl pyromellitate and tetrahexyl pyromellitate;

d. phosphoric acid derivatives such as triethyl phosphate, tributyl phosphate, trioctyl phosphate, tri-(2-ethylhexyl) phosphate, tributoxyethyl phosphate, triphenyl phosphate, tricresyl phosphate, cresyl diphenyl phosphate, hexyl diphenyl phosphate, 2-ethylbutyl diphenyl phosphate, octyl diphenyl phosphate, 2-ethylhexyl diphenyl phosphate, isooctyl diphenyl phosphate, nonyl diphenyl phosphate, decyl diphenyl phosphate, 2-butyl octyl diphenyl phosphate, tridecyl diphenyl phosphate, tetradecyl diphenyl phosphate, octadecyl diphenyl phosphate, 2-ethylbutyl dicresyl phosphate, n-octyl dicresyl phosphate, isooctyl dicresyl phosphate, 2-ethylhexyl dicresyl phosphate, nonyl dicresyl phosphate, decyl dicresyl phosphate, 2-n-propylheptyl dicresyl phosphate, 2-butyloctyl dicresyl phosphate, tridecyl dicresyl phosphate, tetradecyl dicresyl phosphate, octadecyl dicresyl phosphate, trichloroethyl phosphate and tri-(dimethylphenyl) phosphate;

e. sulfonamides such as N-ethyl-o,p-toluenesulfonamide, N-ethyl-p-toluenesulfonamide, N-cyclohexyl-p-toluenesulfonamide, N-isopropylbenzenesulfonamide, N-n-butyl-p-toluenesulfonamide, N-butyl glycollyl p-toluene-sulfonamide, N-methyl benzenesulfonamide, N-n-propyl benzenesulfonamide, N-sec.-heptyl benzenesulfonamide, N-cyclohexyl benzenesulfonamide, N-methyl xylenesulfonamide, N-cyclohexyl diphenylsulfonamide, N-allyl benzenesulfonamide, N-allyl p-toluenesulfonamide, o,p-toluenesulfonamide, N,N-di-beta-hydroxyethyl p-toluenesulfonamide, N,N-dimethyl benzenesulfonamide, N,N-diethyl benzenesulfonamide, N,N-di-n-butyl benzenesulfonamide, N,N-di-n-butyl p-toluenesulfonamide and N,N-di-n-butyl phenylenedisulfonamide; N,N-bis (cyanoalkyl) arylsulfonamides such as N,N-bis(cyanoethyl) benzenesulfonamide, N,N-bis(2-cyanoisopropyl)-o-toluenesulfonamide, N,N-bis(2-cyanoethyl) xylenesulfonamide, N,N-bis(cyanomethyl) cumenesulfonamide, N-2-cyanoethyl-N-cyanomethyl toluenesulfonamide, N,N-bis(2-cyanoethyl) biphenylsulfonamide, N,N-bis(2-cyanoethyl)-beta-naphthalenesulfonamide, N,N-bis(2-cyanoethyl) 2,3,6-trimethylbenzenesulfonamide, N,N-bis(2-cyanoethyl) isopropylbiphenylsulfonamide, N,N-bis(cyanomethyl) cymenesulfonamide, N,N-bis(2-cyanoethyl) 2,3,6-trimethyl benzenesulfonamide and N,N-bis(2-cyanobutyl) toluenesulfonamide;

f. hydrocarbons, for example, polyphenyls such as o-terphenyl, p-terphenyl, m-terphenyl and mixtures thereof, and partially hydrogenated terphenyl; chlorinated polyphenyls such as chlorinated o-terphenyl, p-terphenyl, m-terphenyl and mixtures thereof and chlorinated biphenyl; alkylated polyphenyls such as isopropyl biphenyl, diisopropyl biphenyl and isopropyl terphenyl; alkyl aryl hydrocarbons such as triethyl benzene, tetraethyl benzene, hexaethyl benzene, diisopropyl benzene, triisopropyl benzene, di-n-propyl benzene, di-n-butyl benzene and partially hydrogenated alkyl aryl hydrocarbon (partially hydrogenated terphenyl and the partially hydrogenated alkyl aryl hydrocarbon are marketed as HB-40 and HB-20 respectively by Monsanto Company).

g. cyanamides, such as dibutyl cyanamide, di-2-ethylhexyl cyanamide, diallyl cyanamide, methylphenyl-propyl cyanamide, ethyl-phenylpropyl cyanamide, propyl phenylpropyl cyanamide, butyl benzyl cyanamide, 2-ethylhexyl benzyl cyanamide, isodecyl benzyl cyanamide and dibenzyl cyanamide;

h. epoxy compounds, for example, epoxy esters containing a long carbon chain such as glycidyl laurate, methyl 9,10-epoxyoctadeconoate, diethylene glycol, di-9,10-epoxyoctadecanoate, 9,10-epoxyoctadecanyl acetate, 9,10-epoxyoctadecanyl octadecanoate, esters of polycarboxylic acids and alcohols containing a

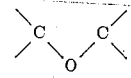

group such as di-2-ethyl hexyl epoxy succinate, butyl glycidyl phthalate, diglycidyl phthalate, propylene glycol diglycidyl phthalate, diethylene glycol diglycidyl maleate, 2-ethyl hexyl glycidyl adipate, hexyl glycidyl sebacate and other esters of these and other polycarboxylic acids containing at least a

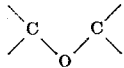

group; glycidols, such as glycidol, beta-methyl glycidol, betaethyl glycidol, beta-hydroxymethyl glycidol and diisobutenyl dioxide; epoxidized ethers such as alkyl glycidol ethers in which the alkyl group contains one to five carbon atoms, e.g., methyl, ethyl, propyl, butyl, amyl glycidyl ethers; glycidyl ethers containing unsaturated groups, such as vinyl, allyl and methylallyl glycidyl ethers, phenyl glycidyl ethers, tolyl glycidyl ether, naphthyl glycidyl ethers, cyclopentyl glycidyl ether and cyclohexyl glycidyl ether; glycidyl ethers of such polyhydric alcohols as glycerin, diglycerol, erythritol, pentaglycerol, pentaerythritol, manitol, sorbitol, polyallyl alcohol, polymethallyl alcohol, polyvinyl alcohol, ethylene glycol, propylene glycol and butylene glycol; glycidyl ethers of polyhydric phenols, for example, mono-nuclear phenols like resorcinol, catechol and hydroquinone; and polynuclear phenols like bis-(4-hydroxyphenyl)-2, 2-propane (bisphenol), 4,4'-dihydroxy benzophenone, bis-(4-hydroxyphenyl)-1,1-ethane, bis-(4-hydroxyphenyl)-1,1-propane, bis-(4-hydroxyphenyl)-1,1-isobutane, bis(4-hydroxyphenyl)-2,2-butane, bis-(4-hydroxy-2-methylphenyl)-2,2-propane, bis-(4-hydroxy-2-tert.-butylphenyl)-2,2-propane, bis-(2-dihydroxy-naphthyl)-methane, 1,5-dihydroxy naphthalene, phloroglucinol, 1,4-dihydroxy naphthalene, 9,10-dihydroxy anthracene, 1,3,6-trihydroxy naphthalene, 4,4-dihydroxy diphenyl, 2,2-bis(4-hydroxyphenyl) propane and 1,4-bis(4-hydroxyphenyl)-cyclohexane, i. chloroalkanes such as polychlorodecane, polychloroundecane, polychlorododecane, polychlorotridecane, polychlorotetradecane, polychloropentadecane, polychlorohexadecane, polychlorooctadecane, polychloroeicosane, polychlorodocosane and polychloropentacosane, and j. terminated polyesters prepared from (1) dihydroxy aliphatic compounds from two to six carbon atoms, for example, the alkylene glycols such as ethylene glycol, 1,2-propanediol, 1,3-propanediol, 2-methyl-2-ethyl-1,3-propanediol, 1,2-butanediol, 1,3-butanediol, 1,4-butanedial, 2,3-butanediol, 2,2-dimethylpropane-1, 3-diol, 1,4-pentanediol, 1,6-hexanediol, 2-methyl-2,4-pentanediol and the like, and the polyalkylene glycols such as diethylene glycol, triethylene glycol and dipropylene glycol, and (2) saturated aliphatic dicarboxylic acids, for example, succinic acid, glutaric acid, adipic acid, pimelic acid, suberic acid, azelaic acid and sebacic acid, and terminated with monocarboxylic acids, for example, saturated acids such as caproic, enanthic, caprylic, pelargonic, capric, undecanoic, lauric, myristic, palmitic, stearic, arachidic and the like, unsaturated acids such as decylenic, palmitoleic, oleic, linoleic and the like, and aromatic acids such as benzoic and naphthoic, and alcohols, for example, saturated aliphatics such as n-butyl alcohol, t-butyl alcohol, isoamyl alcohol, neopentyl alcohol, n-hexyl alcohol, n-octyl alcohol, n-nonyl alcohol, lauryl alcohol, myristal alcohol, cetyl alcohol, n-eicosyl alcohol and the like; phenylalkyl alcohols such as benzyl alcohol, phenylethyl alcohol, phenylbutyl alcohol and the like; and phenoxyalkyl alcohols such as phenoxymethyl alcohol, phenoxybutyl alcohol and the like.

The plasticizers useful in the present invention are characterized by dielectric constant values from about 2 to about 20. Preferably, the plasticized E/VCl/A interpolymer compositions have a dielectric constant value from about 6 to 15. The plasticizer can be incorporated into the E/VCl/A interpolymer over a wide range of concentrations. In general from about 1 part to about 100 parts by weight of plasticizer are used per 100 parts by weight of E/VCl/A interpolymer. In preferred formulations from about 5 parts to about 50 parts by weight of plasticizer are used per 100 parts by weight of E/VCl/A interpolymer.

The preferred plasticized compositions of this invention comprise ethylene/vinyl chloride/acrylamide interpolymers containing 15 to 70 weight percent ethylene, 30 to 85 percent vinyl chloride and 1 to 5% acrylamide, and 5 parts to 50 parts of a plasticizer selected from the group consisting of c and d above.

The following examples will illustrate the invention. Parts and percent are by weight unless otherwise indicated.

EXAMPLE 1

This example illustrates the preparation of a 21/76/3 ethylene/vinyl chloride/acrylamide terpolymer latex.

| Reaction vessel initial charge: | G. |
|---|---|
| K₂S₂O₈ (KPS) | 11.0 |
| NaHCO₃ | 15.0 |
| Fe(NO₃)₃9H₂O | 0.8 |
| Tetrasodium ethylenediaminetetraacetate (Na₄EDTA) | 1.5 |
| Na lauryl sulfate (SLS) | 1.2 |
| H₂O to make 1700 ml. Vinyl chloride (VCl) | 450 |
| Ethylene (E) | 150 |

The above ingredient mixture is heated to 30°C. with stirring to give a reaction pressure of 850 psig. The polymerization is instituted by addition of a 1 M sodium formaldehyde sulfoxylate-NaHSO₂-CH₂O-2H₂(SFS)/1.5 M ammonium hydroxide (NH₄OH) solution to the mixture at a rate of 5.2 ml./hr. at the same time 18 ml./hr. of a 25 percent SLS solution was added and the pressure was kept constant by the addition of pure vinyl chloride as required. After 3 hours a 50 percent solution of acrylamide in water solution is added at 40 ml./hr. Reaction stops after 5.5 hours and the feed streams are turned off. A total of 1,330 g. of VCl, 95 ml. of the 50 percent acrylamide, 27 ml. of the 1 M SFS/1.5 M NH₄OH solution, and 92 ml. of the 25 percent SLS solution are added. The resulting polymer latex is vented out the bottom of the autoclave and a total of about 3,500 g. of the ethylene/vinyl chloride/acrylamide polymer latex is obtained containing 47 percent total solids, and 1.5 percent sodium lauryl sulfate (based on the weight of the polymer). The composition of the terpolymer is about 21/76/3 ethylene/vinyl chloride/acrylamide. The terpolymer is modified by admixture at 50°C. with an aqueous solution of sodium hydroxide in an amount equivalent to about 100 percent of the amide content.

EXAMPLE 2

A dimethylformamide solution of E/VCl/A (unmodified) is admixed with various plasticizers using moderate stirring over a period of one-fourth hour. The E/VCl/A terpolymer contains 21 percent ethylene, 76 percent vinyl chloride and 3 percent acrylamide. The dimethylformamide is removed by evaporation and the plasticized compositions are observed for compatibility, i.e., exudation, blooming or tack development. Results and further details are given in Table 1 below wherein the amount of plasticizer in the plasticized E/VCl/A composition is expressed in parts by weight per 100 parts by weight of E/VCl/A.

TABLE 1

| Plasticizer | Amount | Compatibility |
| --- | --- | --- |
| di(2-ethylhexyl)phthalate | 10 | Good |
| do. | 30 | Good |
| do. | 50 | Good |
| do. | 100 | Good |
| dibutyl phthalate | 10 | Excellent |
| do. | 50 | Excellent |
| do. | 100 | Excellent |
| butyl benzyl phthalate | 25 | Good |
| do. | 50 | Excellent |
| di(2-ethylhexyl)adipate | 50 | Good |
| do. | 100 | Excellent |
| 2-ethylhexyl diphenyl phosphate | 10 | Good |
| do. | 25 | Good |
| do. | 50 | Excellent |

EXAMPLE 3

A 21/76/3 ethylene/vinyl chloride/acrylamide terpolymer latex prepared in accordance with Example 1 and containing 45 percent polymer solids is separated into nine portions of about 100 parts each. One portion is retained for use as control. Each of the remaining eight portions is admixed with 11.2 parts of a plasticizer given in Table 1 below using moderate agitation over a period of about one-fourth hour. The various plasticized ethylene/vinyl chloride/acrylamide latex compositions each contain 25 parts of plasticizer per 100 parts of polymer solids in the latex. About 22.5 parts of each plasticized composition on a dry solids basis are added to an aqueous slurry containing 100 parts of coating clay (LUSTRA, Grade No. 1, Freeport Kaolin Company) and about 44 parts of water. The total solids content of the resulting pigment coating composition is adjusted by the addition of water to about 60 percent solids. The pigment coating compositions are applied to one side of paper (base weight of 45 pounds/3,300 square feet) by means of a No. 8 wire wound drawdown rod at a dry coating weight of 13.5 pounds per ream. The coated paper is dried in an infrared oven at 120°C. for about 1 minute, exposed to 72°F. at 50 percent relative humidity for 8 hours and subjected to one nip calendering. The coated paper is tested for resistance to physical removal of coating during the commercial printing processes by the pick test. Pick resistance, that is, the ability of the coating to resist the pull of printing inks and remain adhered to the particular paper is measured by the IGT Printability Test, a widely accepted standard test developed by the Institut voor Graphische Techniek in Amsterdam, Holland. In the IGT test an ink of measured tackiness is applied uniformly to a standard diameter wheel. A strip of paper containing the test coating is fastened to a spring loaded cylindrical segment of known diameter. The ink laden wheel is placed against one end of the strip of paper at a pressure of 50 kg. The cylinder spring is released and the tacky ink is applied to the strip at an accelerated velocity of from 0 to 630 ft./min. as the strip passes through a given arc. If the coating on the paper is removed ("pick"), a break in the coating will be apparent at some point on the ink printed coated test paper sample. This calibrated point is measured and reported as the velocity in feet per minute withstood by the coating before failure of the coating. The test is run on samples of the coated paper with inks of increasing tackiness until the useful limits of the coated paper sample have been reached. A value of 630 feet per minute represents no failure of the coating with that particular tack graded ink. The next higher number inks are then used in sequence until failure occurs. Results and further details are given in Table 2 below:

TABLE 2

| Plasticizer | IGT Rating No. 5 Ink (ft./min.) | Percent of Control |
| --- | --- | --- |
| Control (none) | 375 | 100 |
| Butyl benzyl phthalate | 592 | 157 |
| Butyl phthalyl butyl glycollate | 630 | 168 |
| Methyl phthalyl ethyl glycollate | 630 | 168 |
| Ethyl phthalyl ethyl glycollate | 550 | 147 |
| Dioctyl adipate | 472 | 126 |
| Dioctyl phthalate | 467 | 124 |
| Dibutyl phthalate | 490 | 130 |
| 2-Ethylhexyl diphenyl phosphate | 630 | 168 |

EXAMPLE 4

Following the procedure of Example 3 except that varying levels of butyl benzyl phthalate are employed as plasticizer and the substrate coated is paperboard (15 point bleached solid sulfate) instead of paper, the results given in Table 3 below are obtained. The amount of plasticizer is given as parts by weight per 100 parts by weight of ethylene/vinyl chloride/acrylamide.

TABLE 3

| Amount of Plasticizer | IGT Rating No. 6 Ink (ft./min.) | Percent of Total |
| --- | --- | --- |
| Control | 390 | 100 |
| 5 | 420 | 108 |
| 15 | 422 | 108 |
| 25 | 502 | 129 |

EXAMPLE 5

A 21/76/3 ethylene/vinyl chloride/acrylamide polymer latex prepared in accordance with Example 1 and containing 45 percent polymer solids is separated into six portions of about 100 parts each. Three portions are used as control coatings. The remaining three portions are each admixed with 11.2 parts of 2-ethylhexyl diphenyl phosphate. The plasticized ethylene/vinyl chloride/acrylamide compositions each contain 25 parts of plasticizer per 100 parts of polymer solids. The plasticized compositions are added separately to an aqueous slurry containing 100 parts of the coating clay used in Example 2 and about 44 parts of water in amounts of 14, 18 and 22 parts respectively. The total solids content of the resulting pigment coating compositions is adjusted by the addition of water to about 60 percent solids. The pigment coating compositions are applied to one side of paper (basis weight of 45 lb./3,300 sq. ft.) by means of a No. 8 wire wound drawdown rod at a dry coating weight of 12.2 pounds per ream. The coated paperboard is air dried at room temperature and is not subjected to calendering. The coated paperboard is then tested for pick resistance. Results and further details are given in Table 4 below:

TABLE 4

| Binder Level | IGT Rating No. 5 Ink (ft./min.) | | Percent of Control |
| --- | --- | --- | --- |
| | Control | Plasticized | |
| 14 | 100 | 215 | 215 |
| 18 | 175 | 500 | 286 |
| 22 | 220 | 630 | 286 |

The improved pigment coating compositions of the present invention are in the form of aqueous dispersions or emulsions comprising water, a finely divided paper coating mineral pigment and a plasticized E/VCl/A interpolymer pigment binder. The quantity of pigment in the paper coating compositions can vary from about 20 parts to about 250 parts by weight for each 100 parts of water. Preferred ranges will vary depending upon the specific plasticized E/VC1/A interpolymer employed, the particular pigment utilized and the desired end use of the finished paper products. A preferred range is from about 50 to about 200 parts by weight of mineral pigment for each 100 parts of water. The amount of plasticized E/VCl/A interpolymer pigment binder in the coating compositions of this invention will vary from about 1 part to about 100 parts by weight for each 100 parts by weight of pigment and preferably from about 10 to about 25 parts by weight of pigment binder for each 100 parts by weight of pigment. The aqueous pigment binder compositions can contain from about 20.2 to about 400 parts of dispersed solids for each 100 parts of water.

The paper-coating pigment is an important component of the coating compositions. The principal functions of the pigment are to fill in the irregularities of the paper surface, to produce an even and uniformly absorbent surface for printing and to improve the appearance of the coated sheet. A suitable pigment should have all or most of the following properties — good dispersibility in water, correct particle size distribution, high opacifying power, high brightness, low water absorption, nonabrasive qualities, chemical inertness, compatibility with other ingredients of the coating mixture, low adhesive requirements, and if colored, a high tinctorial power and color permanence. Suitable pigment coatings include clays such as kaolinite, illite, montmorillonite, and beidellite; and other materials such as titanium dioxide, kieselguhr, precipitated calcium carbonate, waterground calcium carbonate, calcium sulfate, calcium sulfite, barium sulfate, blanc fixe, satin white, and zinc pigments, e.g., zinc oxide, zinc sulfide, and lithopane.

In order to prepare a satisfactory coating mixture, it is necessary to break up aggregates of dry clay into smaller dispersed particles. This is conventionally achieved by adding water and a dispersing agent to the clay solids and agitating the mixture. Suitable dispersing agents include sodium silicate, sodium tetraphosphate, tetrasodium pyrophosphate, sodium hexametaphosphate, alkali metal salts of aryl alkyl sulfonic acids, and alkaline casein. The quantity of dispersing agent used will vary depending upon the particular compound chosen, the amount of water in proportion to the clay, and the desired effectiveness of the dispersion. From 0.1 to 0.5 percent tetrasodium pyrophosphate based on the weight of clay gives an effective dispersion of Georgia kaolinite clay in a 50/50 clay-water slurry. Other concentrations of dispersing agents for other clay slurries can be readily determined. Aqueous clay dispersions can be prepared using heavy-duty mixers such as sigma-blade and dough-type mixers.

The novel pigment binder of the present invention is a plasticized E/VCl/A interpolymer and when used alone is an excellent pigment binder based on performance characteristics of the coated paper. Cost requirements for most applications, however, dictate the inclusion of a less expensive binder along with the plasticized E/VCl/A interpolymer compositions. Such a dilution, a common practice in the use of synthetic resinous pigment binders, provides a significant reduction in cost with only a slight reduction in properties of the coated paper. Examples of commonly used binders include starches, ethylene oxide-modified starches, casein, alpha-protein and other protecinaceous binders. A binder containing about 50 percent starch, casein or other similar binder and 50 percent plasticized E/VCl/A solids has been found to provide a satisfactory costperformance balance for several uses of coated paper. Other ratios of starch or casein solids to plasticized E/VCl/A solids include 95:5, 67:33, 60:40, 40:60, 20:80 and 5:95. The choice of which ratio binder to use will depend upon its properties desired in the final product, the cost of the binder, and upon the particular plasticized E/VCl/A latex employed. The plasticized E/VCl/A interpolymer binder can of course be used in combination with other synthetic pigment binders in latex form, examples being styrene/butadiene copolymers, the acrylic and methacrylic polymers, and various polyvinyl aetate materials.

Particularly suitable for use as a pigment binder are plasticized E/VCl/A interpolymers having from about 50 to 82 percent by weigh polymerized vinyl chloride, from about 17 to 95 percent ethylene and from about 1 to about 5 percent by weight acrylamide, and from about 5 to about 50 parts of plasticizer per 100 parts of E/VCl/A polymer of a plasticizer represented by $c$ and $d$ above.

If the binder is to be a plasticized E/Vcl/A interpolymer undiluted by starch or casein, the stable plasticized E/VCl/A latex preferably having at least 35 percent solids, can be added to the clay suspension in sufficient quantity to provide a total binder solids content of from about 1 to 100 parts by weight for each 100 parts by weight of the pigment. If the binder is a plasticized E/VCl/A interpolymer starch or protein mixture, the starch or casein can be first added to the polymer latex, and the plasticized E/VCl/A latex-starch or casein mixture added to the clay suspension to bring the binder solids content to the desired level in the coating composition. An alternate method is to add the starch or casein to the pigment slurry and mix prior to the addition of the plasticized E/VCl/A interpolymer latex. This method is suitable for the preparation of stable coating compositions of low (25 to 40 percent) solids content. A technique used to prepare coating compositions of high solids (60 to 75 percent) content comprises adding starch or casein to the E/VCl/A interpolymer latex, adding the dry pigment and mixing.

In addition to the water, pigment and plasticized E/VCl/A interpolymer binder, coating compositions may contain certain minor ingredients added for a number of reasons. These materials include pin oil, sulfonated tall oil, defoamants, wax, viscosity stabilizers, shellac, dyestuffs, fungicides, slimicides, dispersants, coalescing aids. etc. An important additive optionally incorporated into the present coating compositions are those materials which promote the curing of the plasticized E/VCl/A interpolymer. Such additives include polyethylene imine, zinc oxide, ureas, urea-formaldehyde resins, melamine resins, melamine-formaldehyde resins, etc. These materials are usually used at concentrations of about 10 percent to about 25 percent of the plasticized E/VCl/A interpolymer.

The pigment coating compositions are applied to the paper or paperboard using any of the conventional methods well known to the art, such as a roll coater, blade coater, air knife or size press. The paper or paperboard is generally coated with from about 2 pounds to about 15 pounds of pigment coating composition per side per ream (3,300 square feet) on a dry basis. The amount of coating will vary depending upon the substrate being coated and the end use thereof. The coated paper or paperboard products of this invention comprise a base sheet and a coating adhered to at least one surface of the base sheet, the coating comprising a pigment and a plasticized E/VCl/A interpolymer pigment binder. The finished coating can contain from about one to about 100 parts by weight of plasticized E/VCl/A binder for each 100 parts of pigment.

The plasticized E/VCl/A interpolymer compositions of this invention are also useful as protective coatings for substrates such as wood, metal and glass; as laminating adhesives for safety glass, paper products and the like; as wrapping films and sheeting and as shaped articles such as protective bumper extensions and caps. When used as protective coatings for substrates such as wood, metal and glass the plasticized E/VCl/A interpolymer compositions can be applied in the form of an organic solvent solution or in the form of aqueous dispersions optionally containing pigments and dyes.

The embodiments of this invention in which a particular property or privilege is claimed are defined as follows:

1. Plasticized ethylene/vinyl chloride/acrylamide composition comprising (I) an ethylene/vinyl chloride/acrylamide interpolymer selected from the group consisting of (A) an ethylene/vinyl chloride interpolymer containing from about 2 to about 70 weight percent ethylene, from about 30 to about 88 weight percent vinyl chloride, and from 0.1 to about 10 weight percent of a polar component selected from the group consisting of 1. acrylamide, and
2. acrylamide in combination with at least one additional polar monomer selected from the group consisting of acrylonitrile, N-(alkyl) acrylamide, having from one to three carbon atoms in said alkyl groups N-methylol acrylamide, N[2-(2-methyl-4-oxopentyl)]acrylamide, methacrylamide, N-(alkyl) methacrylamide, having from one to three carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylylamide and methacrylylamides of aminoalkanoic acids having from two to six carbon atoms in said aminoalkanoic acid, hydroxyethyl and hydroxypropyl esters of acrylic, methacrylic, maleic, and fumaric acids, vinyl esters of alkanoic acids having from one to six carbon atoms and alkyl sulfonic acid having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides, having from one to six carbon atoms in said hydroxyalkyl moieties;

and (B) interpolymers of the type described in (A) treated with an acid or a base having an ionization constant higher than about $10^{-4}$ in amounts equivalent to up to about 100 percent of the amide content of said interpolymer, and (II) a plasticizing amount of compatible plasticizer.

2. Composition of claim 1 wherein the interpolymer contains from about 15 to about 70 weight percent ethylene, from about 30 to about 85 weight percent vinyl chloride and from about 1 to about 5 weight percent acrylamide.

3. Composition of claim 1 wherein the plasticizer is selected from the group consisting of
   a. esters having up to 22 carbon atoms formed by the reaction of an aliphatic monocarboxylic acid having from two to 18 carbon atoms and an alcohol selected from the group consisting of monohydric alcohols having from one to six carbon atoms, dihydric alcohols having from two to eight carbon atoms, glycerol, tetrahydrofurfuryl alcohol, and ether alcohols having from two to eight carbon atoms;
   b. esters formed by the reaction of an aliphatic polycarboxylic acid having from six to 10 carbon atoms and an alcohol selected from the group consisting of monohydric alcohols having from one to 11 carbon atoms, tetrahydrofurfuryl alcohol, and ether alcohols having from two to eight carbon atoms;
   c. esters formed by the reaction of an aryl carboxylic acid having from seven to 10 carbon atoms and an alcohol selected from the group consisting of monohydric alcohols having from one to 13 carbon atoms, dihydric alcohols having from two to six carbon atoms, glycerol, pentaerythritol, phenols having from six to eight carbon atoms, tetrahydrofurfuryl alcohol, and ether alcohols having from two to eight carbon atoms;

d. phosphoric acid derivatives selected from the group consisting of trialkyl phosphates, trialkoxy alkyl phosphates, alkyl aryl phosphates, trialkylaryl phosphates, triaryl phosphates and trihaloalkyl phosphates having two to 18 carbon atoms in each alkyl or alkoxy group;

e. sulfonamides selected from the group consisting of N-alkyl and N-allyl arylsulfonamides, arylsulfonamides, hydroxyalkyl arylsulfonamides, N,N-dialkyl arylsulfonamides, and N,N-bis(cyanoalkyl) arylsulfonamides of not more than 12 carbon atoms in each alkyl or aryl group;

f. hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from two to four carbon atoms;

g. cyanamides selected from the group consisting of allyl cyanamide, alkyl cyanamides and aralkyl cyanamides wherein the alkyl group contains from about one to about 10 carbon atoms and the aralkyl group contains from about seven to about nine carbon atoms, h. epoxy compounds selected from the group consisting of epoxy esters, glycidols and glycidyl ethers, i. chloroalkanes and mixtures thereof having from about 10 to about 25 carbon atoms, from about seven to about 21 chlorine atoms, and containing an average of 40 to 70 weight percent chlorine, and j. terminated polyesters having an average molecular weight of less than 4,000 comprising the residue of a dihydroxy aliphatic compound of from two to six carbon atoms and a saturated, aliphatic dicarboxylic acid of from four to 10 carbon atoms, said polyester being terminated with a member selected from the group consisting of residues of monocarboxylic saturated and unsaturated aliphatic acids of from six to 20 carbon atoms, benzoic acid, naphthoic acid, saturated aliphatic alcohols of from four to 20 carbon atoms and phenylalkyl and phenoxyalkyl alcohols of from seven to 10 carbon atoms.

4. Composition of claim 3 wherein the plasticizer is represented by *a*.

5. Composition of claim 3 wherein the plasticizer is represented by *b*.

6. Composition of claim 3 wherein the plasticizer is represented by *c*.

7. Composition of claim 3 wherein the plasticizer is represented by *d*.

8. Composition of claim 4 wherein the plasticizer is an oleate.

9. Composition of claim 5 wherein the plasticizer is a dialkyl adipate.

10. Composition of claim 9 wherein the adipate is a dioctyl adipate.

11. Composition of claim 6 wherein the plasticizer is an alkyl aryl phthalate.

12. Composition of claim 11 wherein the phthalate is butyl benzyl phthalate.

13. Composition of claim 6 wherein the plasticizer is a dialkyl phthalate.

14. Composition of claim 13 wherein the phthalate is dibutyl phthalate.

15. Composition of claim 13 wherein the phthalate is dioctyl phthalate.

16. Composition of claim 6 wherein the plasticizer is an alkyl phthalyl alkyl glycollate.

17. Composition of claim 7 wherein the plasticizer is an alkyl diaryl phosphate.

18. Composition of claim 17 wherein the phosphate is 2-ethylhexyl diphenyl phosphate.

19. Aqueous coating composition comprising a pigment and from about 1 to about 100 parts by weight, per 100 parts by weight of pigment, of a plasticized ethylene/vinyl chloride/acrylamide composition comprising (I) an ethylene/vinyl chloride/acrylamide interpolymer selected from the group consisting of (A) an ethylene/vinyl chloride interpolymer containing from about 2 to about 70 weight percent ethylene, from about 30 to about 88 weight percent vinyl chloride, and from 0.1 to about 10 weight percent of a polar component selected from the group consisting of 1. acrylamide, and
2. acrylamide in combination with at least one additional polar monomer selected from the group consisting of acrylonitrile, N-(alkyl) acrylamide, having from one to three carbon atoms in said alkyl groups, methacrylamide, N-(alkyl) methacrylamide, having from one to three carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylylamide and methacrylylamides of aminoalkanoic acids having from two to six carbon atoms in said aminoalkanoic acid, hydroxyethyl and hydroxypropyl esters of acrylic, methacrylic, maleic, and fumaric acids, vinyl esters of alkanoic acids having from one to six carbon atoms and alkyl sulfonic acid having from one to six carbon atoms, phenylsulfonic acids, and acrylyl and methacrylyl esters hydroxyalkylsulfonic acid having from one to six carbon atoms in said alkyl moieties, and hydroxyalkylsulfonamides, having from one to six carbon atoms in said hydroxyalkyl moieties;

and (B) interpolymers of the type described in (A) treated with an acid or a base having an ionization constant higher than about $10^{-4}$ in amounts equivalent to up to about 100 percent of the amide content of said interpolymer, and (II) a compatible plasticizer.

20. Composition of claim 19 wherein the interpolymer contains from about 15 to about 70 weight percent ethylene, from about 30 to about 85 weight percent vinyl chloride and from about 1 to about 5 weight percent acrylamide.

21. Composition of claim 19 wherein the plasticizer is selected from the group consisting of a. esters having up to 22 carbon atoms formed by the reaction of an aliphatic monocarboxylic acid having from two to 18 carbon atoms and an alcohol selected from the group consisting of monohydric alcohols having from one to six carbon atoms, dihydric alcohols having from two to eight carbon atoms, glycerol, tetrahydrofurfuryl alcohol, and ether alcohols having from two to eight carbon atoms;

b. esters formed by the reaction of an aliphatic polycarboxylic acid having from six to 10 carbon atoms and an alcohol selected from the group consisting of monohydric alcohols having from one to 11 carbon atoms, tetrahydrofurfuryl alcohol, and ether alcohols having from two to eight carbon atoms;

c. esters formed by the reaction of an aryl carboxylic acid having from seven to 10 carbon atoms and an alcohol selected from the group consisting of monohydric alcohols having from one to 13 carbon atoms, dihydric alcohols having from two to six carbon atoms, glycerol, pentaerythritol, phenols having from six to eight carbon atoms, tetrahydrofurfuryl alcohol, and ether alcohols having from 2 to 8 carbons;

d. phosphoric acid derivatives selected from the group consisting of trialkyl phosphates, trialkoxy alkyl phosphates, alkyl aryl phosphates, trialkylaryl phosphates, triaryl phosphates and trihaloalkyl phosphates having two to 18 carbon atoms in each alkyl or alkoxy group;

e. sulfonamides selected from the group consisting of N-alkyl and N-allyl arylsulfonamides, arylsulfonamides, hydroxyalkyl arylsulfonamides, N,N-dialkyl arylsulfonamides, and N,N-bis(cyanoalkyl) arylsulfonamides of not more than 12 carbon atoms in each alkyl or aryl group;

f. hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from two to four carbons;

g. cyanamides selected from the group consisting of allyl cyanamide, alkyl cyanamides and aralkyl cyanamides wherein the alkyl group contains from about one to about 10 carbon atoms and the aralkyl group contains from about seven to about nine carbon atoms, h. epoxy compounds selected from the group consisting of epoxy esters, glycidols and glycidyl ethers, i. chloroalkanes and mixtures thereof having from about 10 to about 25 carbon atoms, from about seven to about 21 chlorine atoms and containing an average of 40 to 70 weight percent chlorine, and j. terminated polyesters having an average molecular weight of less than 4,000 comprising the residue of a dihydroxy aliphatic compound of from two to six carbon atoms and a saturated, aliphatic dicarboxylic acid of from four to 10 carbon atoms, said polyester being terminated with a member selected from the group consisting of residues of monocarboxylic saturated and unsaturated aliphatic acids of from six to 20 carbon atoms, benzoic acid, naphthoic acid, saturated aliphatic alcohols of from four to 20 carbon atoms and phenylalkyl and phenoxyalkyl alcohols of from seven to 10 carbon atoms.

22. Composition of claim 21 wherein the plasticizer is represented by a.

23. Composition of claim 21 wherein the plasticizer is represented by b.

24. Composition of claim 21 wherein the plasticizer is represented by c.

25. Composition of claim 21 wherein the plasticizer is represented by d.

26. Composition of claim 22 wherein the plasticizer is an oleate.

27. Composition of claim 23 wherein the plasticizer is a dialkyl adipate.

28. Composition of claim 27 wherein the adipate is a dioctyl adipate.

29. Composition of claim 24 wherein the plasticizer is an alkyl aryl phthalate.

30. Composition of claim 29 wherein the phthalate is butyl benzyl phthalate.

31. Composition of claim 24 wherein the plasticizer is a dialkyl phthalate.

32. Composition of claim 31 wherein the phthalate is dibutyl phthalate.

33. Composition of claim 31 wherein the phthalate is dioctyl phthalate.

34. Composition of claim 24 wherein the plasticizer is an alkyl phthalyl alkyl glycollate.

35. Composition of claim 25 wherein the plasticizer is an alkyl diaryl phosphate.

36. Composition of claim 35 wherein the phosphate is 2-ethylhexyl diphenyl phosphate.

37. Cellulosic substrate having on at least one surface thereof a dried coating comprising a pigment and from about 1 to about 100 parts by weight, per 100 parts by weight of pigment, of a plasticized ethylene/vinyl chloride/acrylamide composition comprising (I) an ethylene/vinyl chloride/acrylamide interpolymer selected from the group consisting of (A) an ethylene/vinyl chloride interpolymer containing from about 2 to about 70 weight percent ethylene, from about 30 to about 88 weight percent vinyl chloride, and from 0.1 to about 10 weight percent of a polar component selected from the group consisting of 1. acrylamide, and 2. acrylamide in combination with at least one additional polar monomer selected from the group consisting of acrylonitrile, N-(alkyl) methacrylamide, having from one to three carbon atoms in said alkyl groups, acrylic acid, methacrylic acid and alkali metal and ammonium salts of acrylic and methacrylic acid, maleic and fumaric acids, itaconic and citraconic acids, half alkyl esters of maleic, fumaric, itaconic, and citraconic acids having from one to six carbon atoms in said alkyl groups, acrylyl and methacrylyl esters of hydroxyalkanoic acids having from two to six carbon atoms in said alkanoic acids, acrylyamide and methacrylylamides of aminoalkanoic acids having from two to six carbon atoms in said aminoalkanoic acid, hydroxyethyl and hydroxypropyl esters of acrylic, methacrylic, maleic, and fumaric acids, vinyl esters of alkanoic acids having from one to six carbon atoms and alkyl sulfonic acid having from one to six carbon atoms, phenylsulfonic acids, and acrylyl and methacrylyl esters of hydroxyalkylsulfonic acid having from one to six carbon atoms in said alkyl moieties, and hydroxyalkylsulfonamides, having from one to six carbon atoms in said hydroxyalkyl moieties;

and (B) interpolymers of the type described in (A) treated with an acid or a base having an ionization constant higher than about $10^{-4}$ in amounts equivalent to up to about 100 percent of the amide content of said interpolymer, and (II) a compatible plasticizer.

38. Composition of claim 37 wherein the interpolymer contains from about 15 to about 70 weight percent ethylene, from about 30 to about 85 weight percent vinyl chloride and from about 1 to about 5 weight percent acrylamide.

39. Composition of claim 37 wherein the plasticizer is selected from the group consisting of
   a. esters having up to 22 carbon atoms formed by the reaction of an aliphatic monocarboxylic acid having from two to 18 carbon atoms and an alcohol selected from the group consisting of monohydric alcohols having from one to six carbon atoms, dihydric alcohols having from two to eight carbon atoms, glycerol, tetrahydrofurfuryl alcohol, and ether alcohols having from two to eight carbon atoms;
   b. esters formed by the reaction of an aliphatic polycarboxylic acid having from six to 10 carbon atoms and an alcohol selected from the group consisting of monohydric alcohols having from one to 11 carbon atoms, tetrahydrofurfuryl alcohol, and ether alcohols having from two to eight carbon atoms;
   c. esters formed by the reaction of an aryl carboxylic acid having from seven to 10 carbon atoms and an alcohol selected from the group consisting of monohydric alcohols having from one to 13 carbon atoms, dihydric alcohols having from two to six carbon atoms, glycerol, pentaerythritol, phenols having from six to eight carbon atoms, tetrahydrofurfuryl alcohol, and ether alcohols having from two to eight carbon atoms;
   d. phosphoric acid derivatives selected from the group consisting of trialkyl phosphates, trialkoxy alkyl phosphates, alkyl aryl phosphates, trialkylaryl phosphates, triaryl phosphates, and trihaloalkyl phosphates having two to 18 carbon atoms in each alkyl or alkoxy group;
   e. sulfonamides selected from the group consisting of N-alkyl and N-allyl arylsulfonamides, arylsulfonamides, hydroxyalkyl arylsulfonamides, N,N-dialkyl arylsulfonamides, and N,N-bis(cyanoalkyl) arylsulfonamides of not more than 12 carbon atoms in each alkyl or aryl group.
   f. hydrocarbons selected from the group consisting of polyphenyls, chlorinated polyphenyls, alkylated polyphenyls, partially hydrogenated polyphenyls, alkyl aryl hydrocarbons and partially hydrogenated alkyl aryl hydrocarbons wherein the alkyl group contains from two to four carbons;
   g. cyanamides selected from the group consisting of allyl cyanamide, alkyl cyanamides and aralkyl cyanamides wherein the alkyl group contains from about one to about 10 carbon atoms and the aralkyl group contains from about seven to about nine carbon atoms,
   h. epoxy compounds selected from the group consisting of epoxy esters, glycidols and glycidyl ethers,
   i. chloroalkanes and mixtures thereof having from about 10 to about 25 carbon atoms, from about seven to about 21 chlorine atoms, and containing an average of 40 to 70 weight percent chlorine, and
   j. terminated polyesters having an average molecular weight of less than 4,000 comprising the residue of a dihydroxy aliphatic compound of from two to six carbon atoms and a saturated, aliphatic dicarboxylic acid of from four to 10 carbon atoms, said polyester being terminated with a member selected from the group consisting of residues of monocarboxylic saturated and unsaturated aliphatic acids of from six to 20 carbon atoms, benzoic acid, naphthoic acid, saturated aliphatic alcohols of from four to 20 carbon atoms and phenylalkyl and phenoxyalkyl alcohols of from seven to 10 carbon atoms.

40. Composition of claim 39 wherein the plasticizer is represented by c.

41. Composition of claim 3 wherein the plasticizer is represented by (C) and is present in an amount from about 5 to about 50 parts by weight for each 100 parts by weight of interpolymer and said interpolymer contains from about 15 to 70 percent by weight polymerized vinyl chloride, from 30 to about 85 percent by weight ethylene and 1 to 5 weight percent acrylamide.

* * * * *